Sept. 13, 1966     R. R. FAULKNER     3,272,732
WORK HOLDING DEVICE

Filed Dec. 13, 1961     2 Sheets-Sheet 1

INVENTOR.
RICHARD R. FAULKNER
BY
Woodhams Blanchard & Flynn
ATTORNEYS

*INVENTOR.*
*RICHARD R. FAULKNER*
BY
*Woodhams Blanchard & Flynn*
ATTORNEYS

United States Patent Office 3,272,732
Patented Sept. 13, 1966

3,272,732
WORK HOLDING DEVICE
Richard R. Faulkner, Kalamazoo Township, Kalamazoo County, Mich., assignor to Hammond Machinery Builders, Inc., Kalamazoo, Mich., a corporation of Michigan
Filed Dec. 13, 1961, Ser. No. 158,961
8 Claims. (Cl. 204—297)

This invention relates to work holding devices and it particularly relates to a rotatable work holding device especially adapted for use in connection with electro-erosion metal removing processes.

The present invention deals specifically with a subject matter of United States Patent No. 2,919,522 to Philip J. Robischung and assigned to the same assignee as the present application and constitutes an improvement thereover particularly adapted for handling higher amperages as hereinafter set forth.

In the provision of electro-erosion types of equipment for carrying out metal removing processes, it must be borne in mind that large quantities of electrical current are normally employed. For example, the specific embodiment utilized to illustrate the present invention was designed for carrying a D.C. current of 3,000 amperes. At the same time, however, the voltages involved must be very low in order to avoid imparting unpleasant sensations to the operator. Therefore, in order to carry the very high current involved, and in view of the necessary low voltages, it is necessary that resistance throughout the electrical circuit be held to a minimum.

In a fixed work holding device, it may be assumed that the necessary low resistance may be readily provided. However, where the work holding device is intended to move in order to present successive workpieces to a working point, or in order to present a given workpiece to different work stations, then there are required moving parts within the work holding device and this appreciably complicates the problem of minimizing resistances.

Accordingly, the objects of the invention include:

(1) To provide a work holding device for use with electro-chemical type of metal removing apparatus adaptable for low voltage and high amperage use, such as 3000 amperes at 15 or less volts.

(2) To provide an apparatus as aforesaid having internal parts which are relatively movable with respect to each other whereby a workpiece may be moved with respect to the metal removing element, such as an electrolytic type of grinding wheel.

(3) To provide a work holder as aforesaid wherein the relatively movable parts will effect the required relative movement with respect to each other without creating an excessive resistance component in the electric circuit.

(4) To provide an apparatus as aforesaid wherein the relatively movable parts are shielded from contamination by foreign materials, either those originating in the electro-chemical operation or externally thereto.

(5) To provide a work holding device as aforesaid which is adaptable for use with a variety of different specific means for gripping the workpieces.

(6) To provide an apparatus as aforesaid which is adaptable for use with a variety of different means for effecting indexing of a rotatable work table.

(7) To provide an apparatus as aforesaid having a rotatable table adapted for indexing a plurality of workpieces to a work station.

Other objects and purposes of the invention will be apparent to persons acquainted with devices of this general type upon reading the following disclosure and inspection of the accompanying drawings.

Figure 1:
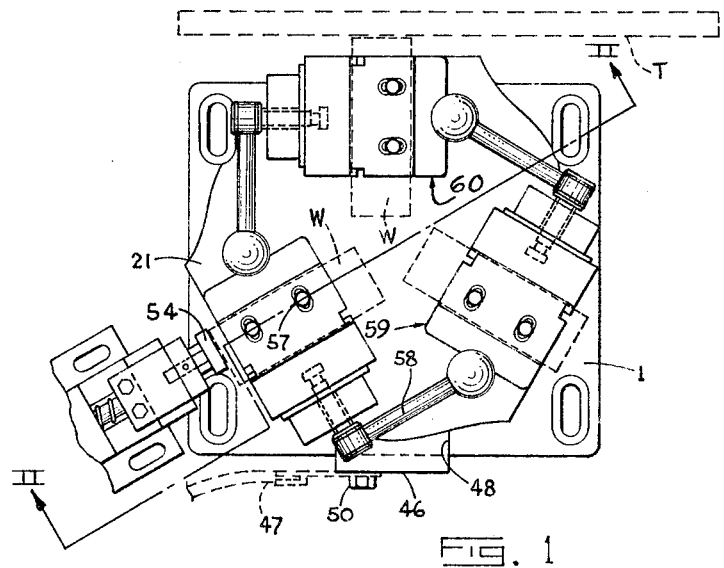
FIGURE 1 is a top plan view of an apparatus embodying the invention.
Figure 2:
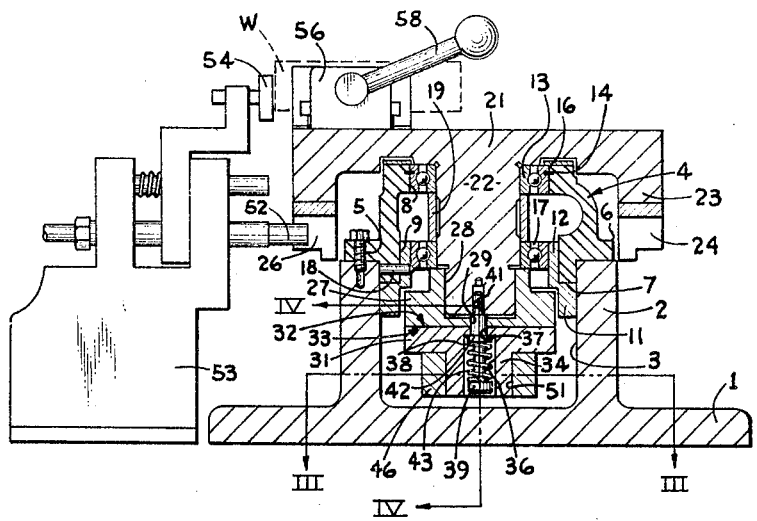
FIGURE 2 is a section substantially taken on the line II—II of FIGURE 1.

Turning now to the drawings, there is provided a base 1, in this embodiment of generally rectangular shape, having hollow boss 2 upstanding therefrom. Said boss 2 has a circular opening 3 therewithin for the reception of certain operating parts of the apparatus. A spindle housing 4 has a peripherally extending flange 6 resting on top of the boss 2 for supporting said spindle housing thereon. Said spindle housing includes a pilot 7 which extends into and fits snugly within the opening 3 for centering said spindle housing with respect to the boss 2.

Said spindle housing has a first opening 8 of one diameter at its upper end and a second opening 9 of larger diameter at its lower end. The zone between said openings is cored out to minimize the metal required for the part.

A bearing retainer 11 is located immediately below said pilot 7, fits snugly against lower end of said pilot and within the opening 3 and has a bearing retaining sleeve 12 extending upwardly from the upper end thereof and fitting snugly within the spindle housing. The external surface of said sleeve 12 fits snugly against the internal surface of said spindle housing within the opening 9. An upper bearing 13 is received within the opening 8 and may be held therein by a suitable means such as a snap ring 14 and further held by a flange 16 which flange is fastened to the upper end of the spindle housing 4 in any convenient manner. The lower bearing 17 fits snugly within the internal opening of the sleeve 12 and is held therein by a set screw 18. A spacer 19 holds said two bearings properly spaced.

The table 21 is made of electrically conductive material, in this particular embodiment such material being phosphor-bronze, and has a central post 22 which is rotatably received within the bearings 13 and 17. Said table has a depending peripheral skirt 23 which is slotted at intervals, two of said slots appearing at 24 and 26, into which extend suitable stop means for holding purposes, as hereinafter more fully described.

At the lower end of the post 22 there is affixed an upper brush plate 27, likewise of electrically conductive material and, again, in this particular embodiment made of phosphor-bronze. Said upper brush plate is provided with a first central opening 28 which snugly receives the lower end of the table post 22 in non-rotatable relationship therewith, such as by being pressed thereinto. Said brush plate has a lower surface of area greater than the cross-sectional area of the portion of the post 22 encompassed by bearings 13 and 17. Said upper brush plate also has a second, smaller opening 29 for purposes more fully described hereinafter.

The lower brush plate 31, likewise made of electrically conductive material, but this time preferably phosphor-brass, has an upper surface 32 which is in snug contact with and substantially the same size and shape as the lower surface 33 of the upper brush plate and has a downwardly depending postlike portion 34 for purposes appearing hereinafter. The lower surface 33 and the upper surface 32 are here symmetrical with respect to the axis of rotation of the post 22. A central opening 36 extends axially through said postlike portion 34 and has a portion 37 of diminished diameter in order to provide a shoulder 38. A screw 39 extends through said openings 36 and 37 and also through the opening 29 to be threadedly received into a suitably threaded opening 41 in the central table post 22. A washer 42 rests against the shoulder 38 and a spring 43 is positioned between said washer and the head of the screw 39. Thus, upon appropriate turning of said screw 39 into the threaded opening 41, a controlled amount of resiliently backed pressure may be applied through the washer 42 against the shoulder 33 and thereby the lower brush plate 31, the upper brush plate 27 and the table post 22 are all caused to be held snugly together.

Figure 3:
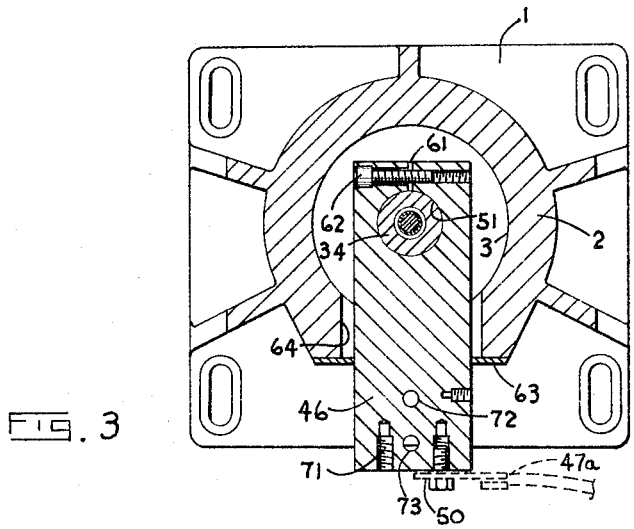
FIGURE 3 is a section taken on the line III—III of FIGURE 2.

A bus bar 46, made of heavy electrically conductive material, in this instance preferably copper, is of generally rectangular shape and is provided with an opening 51 into which is snugly received the stem 34 of the lower brush plate 31. Said stem is received sufficiently tightly into said opening 51 that rotation therebetween will not normally occur. Communicating with said opening 51 is a slot 61 (FIGURE 3), the adjacent sides of which are urged together by a screw 62 for controlling the tension of the sides of the opening 51 against the stem 34.

Figure 4:
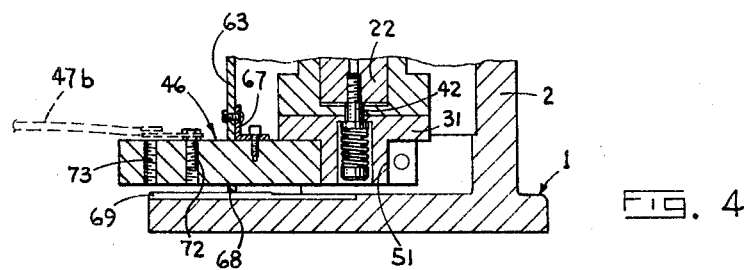
FIGURE 4 is a section taken on the line IV—IV of FIGURE 2.
Figure 5:
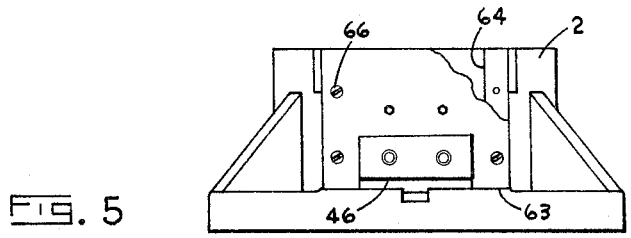
FIGURE 5 is a front view of the base portion of the apparatus showing the opening through which the electrical bus bar extends.
Figure 6:
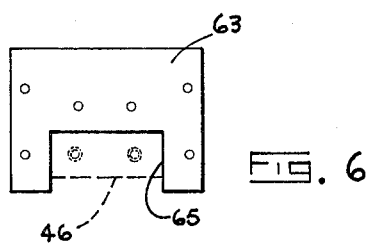
FIGURE 6 is a solid-line view of a plate of said base portion and showing said bus bar in phantom.

Mounting means for said bus bar are provided by a plate 63, made from insulative material, which closes an opening 64 provided through the hollow boss 2 and is fastened in place by suitable screws of which one is indicated at 66. An opening 65 is provided through said plate for extension of said bus bar therethrough. A bracket 67 (FIGURE 4) is provided for fastening said bus bar onto the plate 63. If desired the space otherwise existing between the upper surface and the base 1 of the lower surface of the bus bar 46 may be closed by a strip 68 of resilient material, such as rubber, which, however, may be omitted without detracting from the resulting product.

A drainage channel 69 may be provided from the central portion of the zone within the hollow boss 2 in order to prevent accumulation of electrolyte within said hollow boss 2.

A suitable cable, indicated at 47, is mechanically and electrically connected by a screw 50 to the bus bar 46 for supplying electrical potential thereto. Other cables, such as the cables indicated in broken lines at 47a and 47b may also be fastened to said bus bar where a plurality of cables is necessary to provide the necessary current to said bus bar and same may be fastened thereto by screws associated with other openings in said bus bar, such as the openings 71, 72 and 73.

Returning now to the holding means above mentioned, the same in this instance is provided by a reciprocable pin 52 which is mounted on any convenient base 53 and can reciprocate under the control of the machine operator by any convenient means, not shown. If desired, said base 53 may also support a guide element 54 adjustable radially with respect to said table 21 by which a workpiece W held within a vise 56 is suitably spaced with respect to the center of the table 21 so that it will be properly located with respect to the metal removing tool, such as an electro-erosion grinding wheel T.

The vise 56 may be of any convenient type chosen according to the size and kind of workpiece to be handled, affixed rigidly in any convenient manner, such as through the bolt slots 57 to the upper surface of the table 21 and opened and closed in a known manner by the handle 58. Further similar vises 59 and 60 will normally be provided at other spaced intervals around the table 21.

Operation

The locating of a workpiece W into a vise 56 by reference to the guide 54, and the clamping of said workpiece into desired position within said vise proceeds in a known manner and needs no detailing. Said workpiece W is then presented to the material removing wheel T by rotation of the table 21. The upper brush plate 27 rotates with said table 21 and hence there is no relative motion between the table 21 and the upper brush plate 27.

Since as above noted the lower brush plate 31 does not rotate with respect to the bus bar 46, the only relatively movable surfaces through which the electrical current is required to pass are the mutually contacting substantially planar surfaces 32 and 33. Since these surfaces are resiliently urged together by the spring 43, under a tension which can be readily adjusted by the rotation of the screw 39, and since the surfaces 32 and 33 can be easily polished to a high degree of smoothness prior to assembly of the device, there will be a minimum of arcing, with resultant pitting, of said surfaces during the operation of the apparatus in spite of the large current passing therethrough. Further, in view of the wide contacting surface, and the very good contact obtained therebetween, the voltage drop between said contacting surfaces is extremely small and can be tolerated.

However, the surfaces 32 and 33 will eventually wear and pit but it is a simple matter to correct same. To do so the screws 5 holding the spindle housing 4 to the hollow boss 2 are removed and the entire assembly removed from the base structure. The screw 39 is then taken out and both brush plates 27 and 31 are then exposed for convenient dressing or replacement as desired.

It will be observed that all of the areas through which electrical current is caused to pass from one member to another provide wide zones of contact and, further, that said surfaces are readily and inexpensively generated by ordinary metal working tools so that, excepting for the surfaces 32 and 33, a minimum if any of polishing or grinding is required to obtain good electrically conductive interengagement of said parts.

It will further be observed that the apparatus is much simpler than that set forth in the above-mentioned Patent No. 2,919,522 but that, though much simpler, it is well adapted to the handling of much larger quantities of electrical current with much less loss of potential together with much less pitting and other damage to the mutually contacting surfaces.

Although a particular embodiment of the invention has been described above in detail for illustrative purposes, it will be recognized that variations or modifications of such disclosure, which lie within the scope of the appended claims, are fully contemplated.

I claim:

1. In a working holding device for use with electro-erosion apparatus, the combination comprising:
   a generally circular table having a depending peripheral skirt and a plurality of notches in said skirt;
   a central post supporting said table;
   a base having a hollow boss upstanding therefrom and means supported at the upper end of said hollow boss for rotatably engaging and supporting said table;
   a generally cup-shaped, upwardly opening upper brush plate snugly embracing and fixed to the lower end of said post and having a substantially planar, lower electrical transfer surface arranged substantially perpendicularly to the axis of said post, said lower surface being located below and underlying the lower end of said post and being of an area greater than the area of the lower end of said post;
   a bus bar affixed rigidly with respect to said base and having an opening therethrough;
   a lower brush plate having a stem portion extending through said opening and arranged in non-rotatable relationship with respect thereto, said lower brush plate having at its upper end a substantially planar electrical transfer surface, said last-named surface being similar in size and shape, and being in contact with, said first-named electrical transfer surface;
   means resiliently urging said lower brush plate against said upper brush plate for urging said electrical transfer surfaces resiliently together;
   whereby the only respectively movable surfaces through which electrical current is transferred from one body to another are of large area and capable of a conforming in a snug area contact with respect to each other.

2. In a work holding device for use with an electro-erosion apparatus, the combination comprising:
a base having an upstanding, generally cylindrical boss thereon, said boss having a central opening therewithin;
a cylindrical spindle housing mounted on the upper end of said boss and extending upwardly therefrom and having a central opening aligned with the central opening in said boss and communicating therewith;
a table of electrically conductive material overlying the upper end of said spindle housing and having an integral, solid central post extending downwardly therefrom through said spindle housing and into the central opening of said boss;
bearing means in said spindle housing for supporting said post for rotation with respect to said spindle housing;
an upper brush blate of electrically conductive material having a central opening extending partway therethrough from the upper end thereof, the bottom end of said post extending into said central opening and snugly engaging the walls thereof over a substantial area so that said upper brush plate is fixed to said post for rotation therewith, said upper brush plate having a flat, continuous, lower surface lying under the bottom end of said post and extending transverse to the axis of rotation of said post and being of substantially greater width than said post;
a lower brush plate of electrically conductive material disposed within said central opening in said boss and having a flat upper surface opposed to, and of substantially the same size and shape as, said lower surface of the upper brush plate;
an axially extending fastener slidably extending upwardly through said lower and upper brush plates and being secured to said post and resilient means acting between said fastener and said lower brush plate for urging said lower brush plate into face-to-face snug engagement with said upper brush plate;
said lower brush plate having a downwardly extending boss thereon;
a bus bar of electrically conductive material having an opening therethrough into which said boss on said lower brush plate extends, said bus bar being affixed to said lower brush plate, said bus bar extending sidewardly through an opening in said boss in said base and being held against rotation whereby said upper brush plate rotates with said table and said lower brush plate is stationary and a good electrical contact exists therebetween so that high amperage current can flow from said bus bar to said table at low voltages.

3. In a work holding device for use with an electro-erosion apparatus, the combination comprising:
a table of electrically conductive material having a central post extending downwardly therefrom;
a base and bearing means mounted on the base for supporting the post for rotation with respect to the base;
an upper brush plate of electrically conductive material having a central opening extending partway therethrough from the top thereof, the bottom end of said post extending into said central opening and snugly engaging the wall thereof so that said upper brush plate is fixed to said post for rotation therewith, said upper brush plate having a smooth lower surface lying under the bottom end of the said post and extending transversely to the axis of rotation of the post, said lower surface being of an area greater than the cross-sectional area of the lower end of the post;
a lower brush plate of electrically conductive material having a smooth upper surface opposed to and of substantially the same size and shape as said lower surface of the upper brush plate, said upper and lower surfaces being symmetrical with respect to the axis of rotation of the post so that they are capable of contacting each other in any rotational position of the post with respect to the lower brush plate;
means resiliently urging said lower brush plate toward said upper brush plate for urging said upper and lower surfaces resiliently together into snug engagement; and
means for applying electrical potential to said lower brush plate.

4. A device of the type described in claim 3, including a bolt slidably extending upwardly through said lower brush plate and said upper brush plate and being threaded into said post substantially coaxial with the axis of rotation thereof;
a spring disposed between the lower surface of said lower brush and the head of said bolt for resiliently urging said lower brush plate against said upper brush plate.

5. In a work holding device for use with an electro-erosion apparatus, the combination comprising:
a table of electrically conductive material having a central post extending downwardly therefrom;
a base and bearing means mounted on the base for supporting the post for rotation with respect to the base;
means providing a smooth lower surface on the bottom end of said post and extending substantially to the axis of rotation of said post, said lower surface being of an area greater than the cross-sectional area of the portion of the post encompassed by said bearing means;
a lower brush plate of electrically conductive material having a smooth upper surface opposed to and of substantially the same size and shape as said lower surface, said upper and lower surfaces being symmetrical with respect to the axis of rotation of the post so that they are capable of contacting each other in any rotational position of the post with respect to the lower brush plate;
means resiliently urging said lower brush plate toward said post for urging said upper and lower surfaces resiliently together into snug engagement; and
means for applying electrical potential to said lower brush plate.

6. A device of the type described in claim 5, in which the means for applying electrical potential to said lower brush plate comprises a bus bar of electrically conductive material affixed to said lower brush plate and being in good electrically conductive contact therewith over an area of substantial size so that high amperage current can flow from said bus bar to said table at low voltages.

7. A device of the type described in claim 5, in which the bearing means comprises a pair of bearings mounted on the base at positions spaced from each other along the axis of said post so that said post is stably supported.

8. A device of the type described in claim 5, in which the table has a depending peripheral skirt surrounding and spaced from said post, said bearing means being located in the space between said skirt and said post so that said skirt protects said bearing means against the entry thereinto of foreign materials, said skirt having positioning means thereon so that the table can be releasably locked in position with respect to said base.

References Cited by the Examiner
UNITED STATES PATENTS

| | | | |
|---|---|---|---|
| 2,645,759 | 7/1953 | Solari | 339—8 |
| 2,741,594 | 4/1956 | Bowersett | 204—224 |
| 2,832,940 | 4/1958 | Furpahs | 339—8 |
| 2,919,522 | 1/1960 | Robischung | 51—217 |

JOHN H. MACK, *Primary Examiner.*

D. R. JORDAN, *Assistant Examiner.*